3,351,544
GAS DETECTING CELL WITH DETACHABLE UNIT
Lewis A. Medlar, Lansdale, Pa., assignor to Honeywell
Inc., a corporation of Delaware
Filed Mar. 23, 1964, Ser. No. 354,056
1 Claim. (Cl. 204—195)

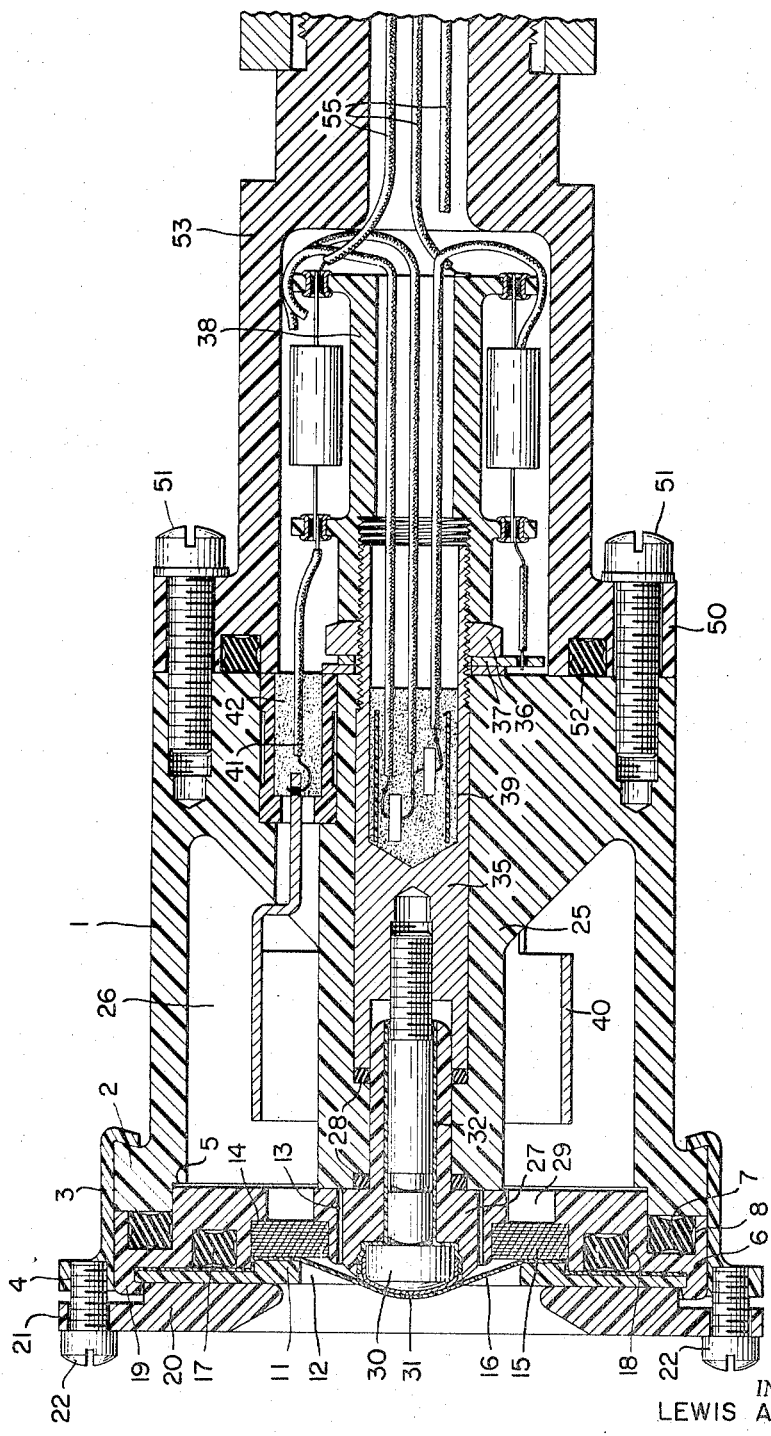

ABSTRACT OF THE DISCLOSURE

A polarographic cell in which a selectively permeable membrane and an electrolyte filter are premounted in a unit which is removeably secured to the remainder of the cell. When this unit is so secured, it supports the membrane in contact with one of the cell electrodes in a position to separate the electrodes and electrolyte from the surrounding medium, and supports the filter in a position between the electrodes.

---

This invention relates to polarographic cells. More specifically, the present invention relates to reducible gas detecting polarographic cells.

An object of the present invention is to provide an improved polarographic cell for detecting a dissolved reducible gas.

Another object of the present invention is to provide an improved dissolved oxygen detector using a polarographic cell technique.

A further object of the present invention is to provide an improved polarographic cell having a selectively permeable membrane arranged in an expendable portion of the cell.

A still further object of the present invention is to provide an improved polarographic cell having a selectively permeable membrane which allows replacement of the membrane without direct handling of the fragile membrane and with an accurate reproduction of the cell characteristics.

Still another object of the present invention is to provide an improved polarographic cell having a rugged and simple construction for protecting the operative cell components while providing ease of repair and disassembly thereof.

In accomplishing these and other objects, there has been provided, in accordance with the present invention, a polarographic cell comprising an outer electrically insulating cylindrical hollow shell arranged as a cup having a cover plate at its open end and arranged to store electrolyte fluid therein. The cover plate is arranged to allow a frusto-conical end of an electrically conducting rod to project therethrough. The rod is mounted in axial alignment with the shell and is arranged to support a first electrode surface on the frusto-conical end. A selectively permeable membrane is held in a disposable section of the cell comprising a pair of aligned annular plates locked together to grip the membrane therebetween. The membrane is arranged across the axial opening in plates which plates are aligned with electrode surfaces projecting through the annular opening. Thus, the membrane is stretched across the first electrode surface. The membrane is held in place by the cover plate which is arranged to mount the disposable section on one end of the hollow shell. A fluid passageway for the electrolyte is provided from the interior of the shell through the disposable section to the underside of the membrane adjacent to the first electrode. A fluid filter means is interposed in the fluid path to filter the electrolyte. The first electrode and rod are mounted in one end of a hollow electrically insulating cylinder extending axially from the inside surface of the bottom of the cup. The rod is hermetically sealed within the cylinder to prevent the electrolyte on the electrode surface from reaching the surface of the rod. The other end of the rod is arranged to provide an electrical connection to the rod and the electrode surface. A second electrode is supported within the hollow shell in contact with the electrolyte and electrically insulated from the rod and first electrode. Electrically insulated support means are provided adjacent to the shell to support circuit elements associated with the cell. A separate electrical connection is made to each of the first electrode, second electrode and the circuit elements. A back cover is fastened to the back outside surface of the cup and is arranged to house the circuit elements and to allow the electrical connections to pass therethrough.

A better understanding of the present invention may be had from the following detailed description when read in connection with the accompanying drawing in which the single figure is a cross-sectional view of an embodiment of the polarographic cell of the present invention.

Referring to the single figure drawing, there is shown a cross-sectional view of a polarographic cell embodying the present invention and comprising an electrically insulating tubular shell 1. One end of the shell 1 is arranged with an outwardly extending peripheral shoulder 2. A clamp ring 3 is disposed on the shoulder 2 and has a plurality of threaded holes 4 in an outwardly extending periphery thereof for accepting the threaded portion of machine screws. The holes 4 are arranged parallel to the longitudinal axis of the shell 1 and symmetrically disposed on the clamp ring 3.

The shoulder 2 has an axially symmetrical depressed surface 5 on the inner edge of the shell 1. A first annular plate 6 is arranged with a conforming surface adjacent to the surface 5 while being spaced therefrom and extending radially past the surface 5 onto the shoulder 2. A sealing ring 7 is carried in an axially aligned groove 8 in a surface of the plate 6 to provide a fluid seal between plate 6 and the shoulder 2. A second annular plate 11 is symmetrically disposed on the first plate 6. A central opening 12 of the plate 11 is axially aligned with a central opening 13 in the first plate 6. The front surface of plate 6 has an inwardly-extending, radially symmetrical groove 14 thereon. The second plate 11 is arranged to mate with the groove 14 in a spaced relationship. An annular fluid filter element 15 is disposed in the groove 14 between the first plate 6 and the second plate 11.

A selectively permeable membrane 16 is also disposed between plates 6 and 11 and across the aligned central openings 12 and 13 therein. A second sealing ring 17 is disposed in a second axially aligned groove 18 spaced inwardly from the groove 8 and on the front surface of the plate 6. This ring 17 is arranged to provide a fluid seal between the membrane 16 and the first plate 6. The first plate 6 and the second plate 11 are tightly gripped together by a turned-over portion of a forwardly extending peripheral lip 19 arranged on the outer periphery of the plate 6.

A front cover annular plate 20 is disposed on top of the plate 11 and is provided with symmetrically spaced holes 21 therein aligned with the threaded holes 4 in the clamp ring 3. A plurality of machine screws 22 are used to attach the cover plate 20 to the clamp ring 3. This arrangement is effective to support the first and second plates 6 and 11 against the shoulder 2 and under the cover plate 20.

The cup 1 is arranged to have an inner extension of the back surface arranged as a forwardly extending axially aligned hollow cylinder 25 to form a hollow annular chamber 26 within the shell 1. The forward edge of the cylinder 25 is arranged to be even with the depressed surface 5 and is spaced from the back surface of plate 6. An electrically insulating hollow extension 27 of the cylinder 25 is supported in a predetermined position within the cylinder 25. One end of the extension 27 is arranged as a frusto-conical surface and is positioned to project into the central opening in first plate 6 to form a partial support for the membrane 16. A peripheral lip on the end of the extension 27 below the frusto-conical surface is butted against the end of the cylinder 25 while the outside surface of the extension 27 is sealed to the inside surface of the hollow cylinder 25 by a plurality of fluid sealing rings 28. The groove 14 is provided with a plurality of holes 29 under the filter 15 and spaced inwardly from the cylinder 25.

An electrically conducting rod 30 is supported within the extension 27 and is hermetically sealed thereto as described hereinafter. An electrode surface 31 is carried on a frusto-conical front end of the rod 30 arranged as a continuation of the front surface of extension 27. The rod 30 may be made of any suitable conducting material; e.g., brass. The electrode surface 31 is arranged to completely cover the frusto-conical end of the rod 30 and to extend back onto the cylindrical surface of the rod 30. The rod 30 is arranged to be adjacent to the inside surface of the extension 27 from the electrode surface 31 to a substantial portion of the length of the rod 30. In order to provide a fluid seal between these adjacent surfaces, the inside surface of extension 27 adjacent to the rod 30 and surface 31 is coated with a fluid impervious sealant 32. The sealant 32 in addition to providing an initial fluid seal should be capable of maintaining the seal notwithstanding the different temperature coefficients of the rod 30 and electrode 31. A suitable material for this purpose has been found to be a polyurethane coating. The use of such a coating is effective to prevent the electrolyte on the electrode 31 from reaching the surface of the rod 30 by providing a flexible adhesive seal capable of eliminating the effects of differing coefficients of expansion of the rod 30 and extension 27.

The rod 30, electrode 31 and extension 27 are arranged to form a frusto-conical surface to support the membrane 16 in a relatively taut condition since the joint frusto-conical surface extends past the assembled spatial position of the front face of plate 11. Accordingly, when the front cover 20 is attached to clamp ring 3, the plates 6 and 11 are pushed against the shoulder 2, and the membrane 16 is pushed out by the electrode surface 31 to a predetermined taut condition. The membrane 16 is supported on the front face of the electrode surface 31 and the extension 27 while a fluid path is provided under membrane 16 from the outer electrode surface 31 through the filter 15, the opening 29 of the first plate 6 into the electrolyte reservoir 26.

The inner end of the rod 30 is threaded and is arranged to be screwed into a threaded hole in one end of an electrically conducting support 35 carried in the cylinder 25 and projecting past the back surface of cup 1. The outwardly projecting end of the support 35 is externally threaded and is attached to the cylinder 25 by a nut 36. The nut 36 is, also, effective to retain a solder lug 37 to provide an electrical connection to the electrode surface 31. A hollow internally threaded circuit component support means 38 may be mounted on the externally threaded end of support 35 rearwardly of the nut 36 to support circuit elements which may be associated with the polarographic cell. Additionally, the threaded end of the support 35 may incorporate a cavity 39 arranged to carry thermally responsive elements; e.g., thermistors, for compensating the thermal characteristics of the cell. Positioning these elements in the cavity 39 would expose them to the effective temperature level within the cell with connections being made through the center of support 38.

A second electrode 40 for the polarographic cell is disposed in the cavity 26 as a cylindrical shell which is spaced from the inner support 25 and is immersed in the electrolyte within the cavity 26. The electrode is supported on the inside surface of the back end of cup 1 and is electrically connected to the outside of the cavity 26 by an electrical connection 41. The connection 41 is brought out through a fluid-tight feed-through means 42 arranged to confine the electrolyte within the cavity 26. The connection 42 is attached to the component support 38 for interconnection with the associated circuit components.

A back cover 50 is attached to the outside surface of the back of the cup 1 by a plurality of machine screws 51. The end of the cup 1 and the back plate 50 are fluid sealed by a rubber ring 52 located inwardly of the screws 60 and outwardly of the feed-through 42. Thus, the space within cover 50 is sealed to provide a fluid-tight housing for the support 38 and the components associated therewith. A wire conduit 53 is provided as an extension of the cover 50 and is aligned with the interior cavity 39 of the support 35 to allow any wires therefrom to be brought out through the component support 38. The rear surface of the extension 53 is formed into an appropriate configuration to provide a mounting means for the polarographic cell. Electrical connections are made to the cell by wires 55 passing through extension 53.

In operation, the sample fluid containing a dissolved reducible gas; e.g., oxygen, is brought in contact with the membrane 16 covering the electrode 31. This may be achieved by either immersing only the membrane covered frusto-conical end in the fluid or any additional desired portion of the cell of the present invention. The molecular oxygen from the fluid permeates the selectively permeable membrane 16 which is arranged to have particular ability to pass oxygen molecules. Such a membrane could advantageously be made of Teflon. The oxygen passes into the electrolyte solution in the vicinity of the electrode head 31. In order to establish a reduction of the oxygen in the electrolyte, the electrode head 31 and electrode 40 are connected to a potential source and are made of metals which in combination with a suitable electrolyte will reduce the oxygen passed by the membrane. The reduction of the oxygen, in accordance with principles well known in the art, is effective to establish a level of conductivity between the electrode 31 and the electrode 40. Accordingly, if the cell of the present invention is included in a circuit to establish a current path through the electrolyte between the electrode elements 31 and 40, the resultant current flow is proportional to the oxygen concentration in the sample solution. The sealing of the surface of rod 30 from the electrolyte by the coating 32 is effective to eliminate spurious chemical reactions while permitting the electrode 31 and extension 27 to form a thin film of electrolyte under the membrane. This thin film is effective to isolate the active layer from the electrolyte in the reservoir 26 to prevent stray oxygen contamination and to improve the response of the cell. Thus, the chemical reaction is stabilized to assure an accurate measure of oxygen concentration in the fluid.

The structure of the cell of the present invention is particularly suitable for providing an easily disassembled unit for purposes of cleaning and/or repair. Further, the condition of the electrolyte may be checked and replenished by means of the front plates 6 and 11, the membrane 16 and filter 15 which are removed as an expendable unit. The removal of the plates 6 and 11 is effected by releasing the front plate 20 from the clamp ring 3. In addition, the combination of the plates 6 and 11, the membrane 16, and the filter 15 forms an expendable unit to facilitate replacement of the membrane 16 and filter 15 and/or the electrode 31 while providing a fluid-tight seal for the electrolyte when the cell is assembled. Thus, use of the replacement unit provides a measure of control on the cell characteristics by eliminating improper membrane and filter mounting and electrolyte leakage while facilitating cell repair.

It is to be noted that the interior volume of the shell 1 may be varied to provide a liquid volume for the electrolyte suitable for a particular application without affecting the remaining structure of the cell. The cell structure is effective to seal the interior of the cup 1 and the electrolyte areas of the cell from the exterior of the cup 1 to allow a complete immersion of the cell in the fluid sample. The parts of the cell which do not enter into the electrochemical reaction but contact the electrolyte may be constructed of an electrically insulating and chemically inert material; e.g., high density polyethylene or polypropylene having a negligible porosity with respect to the reducible gas to be measured, and substantially constant physical stability. Other elements where electrical insulation is not required may be made of inert metals, such as stainless steel.

Thus, it may be seen that there has been provided, in accordance with the present invention, a polarographic cell for measuring dissolved oxygen and characterized by a rugged structure for protecting the cell components while providing ease of repair and disassembly through the use of a replacement membrane support structure and an elimination of spurious chemical reactions.

Subject matter disclosed but not claimed herein is disclosed and claimed in the copending application of Zoltan Nagy, Ser. No. 354,051, filed on even date herewith.

What is claimed is:

In a polarographic cell for measuring the concentration of a dissolved reducible gas in a solution comprising a first electrode, a second electrode, chemically inert housing means supporting said electrodes in a spaced relationship and arranged to contain an electrolyte bridging said electrodes, a selectively permeable membrane in a position in intimate contact with said first electrode to separate said electrolyte and said electrodes from the solution and being selectively gas permeable to the reducible gas, and filter means in a position to separate said second electrode from said first electrode and said membrane and constituting the sole means through which said electrolyte bridges said electrodes, the improvement comprising a unit detachably secured to said housing means for supporting said membrane and said filter means in their said positions, said unit including first and second clamping means between which said membrane and said filter means are clamped, and fastening means releasably attaching said unit to said housing means.

References Cited

UNITED STATES PATENTS

| | | | |
|---|---|---|---|
| 3,088,905 | 5/1963 | Glover | 204—195 |
| 3,098,813 | 7/1963 | Beebe et al. | 204—195 |
| 3,211,638 | 10/1965 | Halvorsen | 204—195 |
| 3,235,477 | 2/1966 | Keyser et al. | 204—195 |
| 3,239,444 | 3/1966 | Heldenbrand | 204—195 |

JOHN H. MACK, *Primary Examiner.*

T. TUNG, *Assistant Examiner.*